(12) United States Patent
Mohammad et al.

(10) Patent No.: US 9,336,502 B2
(45) Date of Patent: May 10, 2016

(54) SHOWING RELATIONSHIPS BETWEEN TASKS IN A GANTT CHART

(71) Applicant: ORACLE INTERNATIONAL CORPORATION, Redwood Shores, CA (US)

(72) Inventors: Imran Mohammad, Woburn, MA (US); Hendrik Van Den Broek, Lexington, MA (US); Margery L. Boots, San Carlos, CA (US); Raymond Wong, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 321 days.

(21) Appl. No.: 13/873,786

(22) Filed: Apr. 30, 2013

(65) Prior Publication Data
US 2014/0325423 A1  Oct. 30, 2014

(51) Int. Cl.
*G06F 3/0484* (2013.01)
*G06Q 10/06* (2012.01)

(52) U.S. Cl.
CPC ...................... *G06Q 10/06* (2013.01)

(58) Field of Classification Search
CPC ............................ G06F 3/0484; G06F 9/4443

USPC .......... 715/772, 810, 204, 786; 718/104, 106, 718/102; 705/7.18
See application file for complete search history.

(56) References Cited

U.S. PATENT DOCUMENTS

| 6,111,575 | A  | * | 8/2000  | Martinez et al. ............... 715/810 |
| 6,674,450 | B1 | * | 1/2004  | Toub ..................... G06F 9/4443 707/999.01 |
| 7,827,476 | B1 | * | 11/2010 | Roberts et al. ................ 715/204 |
| 2004/0093600 | A1 | * | 5/2004  | Takemura ..................... 718/100 |
| 2005/0097536 | A1 | * | 5/2005  | Bernstein et al. ............. 717/156 |
| 2006/0004618 | A1 | * | 1/2006  | Brixius ............................ 705/8 |
| 2006/0129569 | A1 | * | 6/2006  | Dieberger et al. ............. 707/100 |
| 2007/0089067 | A1 | * | 4/2007  | Abbott et al. ................. 715/786 |
| 2009/0158293 | A1 | * | 6/2009  | Kajihara ....................... 718/106 |
| 2009/0199192 | A1 | * | 8/2009  | Laithwaite et al. ........... 718/104 |
| 2012/0306880 | A1 |   | 12/2012 | Mohammad et al. |
| 2012/0306887 | A1 |   | 12/2012 | Mohammad et al. |
| 2013/0282418 | A1 | * | 10/2013 | Furman et al. ............... 705/7.13 |
| 2014/0229953 | A1 | * | 8/2014  | Sevastiyanov et al. ....... 718/102 |

* cited by examiner

*Primary Examiner* — Jennifer To
*Assistant Examiner* — Jasmine Wan
(74) *Attorney, Agent, or Firm* — Miles & Stockbridge P.C.

(57) ABSTRACT

A system for showing a dependency relationship between a first task and a second task in a Gantt chart. The system displays the first task. The system also displays at least one selector. The at least one selector is associated with the first task. Tasks dependent upon the first task are accessible via the at least one selector. The second task is dependent upon the first task. The system also receives a selection of the second task via the at least one selector. The system also displays the second task.

18 Claims, 8 Drawing Sheets

SHOWING RELATIONSHIPS BETWEEN TASKS IN A GANTT CHART

FIELD

One embodiment is directed generally to a computer system, and in particular to a computer system that generates and displays a Gantt chart.

BACKGROUND INFORMATION

Gantt charts illustrate start dates and finish dates of elements of a project. An element of a project can correspond to a task or an activity of the project, for example. The Gantt chart of a project can show the dependency relationships that exist between the elements of the project. Different kinds of dependency relationships between elements can include finish-to-start, finish-to-finish, start-to-start, and start-to-finish.

In a finish-to-start relationship, a second element does not start before a first element is finished. In a finish-to-finish relationship, the second element does not finish before the first element is finished. In a start-to-start relationship, the second element does not start before the first element starts. Finally, in a start-to-finish relationship, the second element does not finish before the first element starts.

SUMMARY

One embodiment is a system for showing a dependency relationship between a first task and a second task in a Gantt chart. The system displays the first task. The system also displays at least one selector. The at least one selector is associated with the first task. Tasks dependent upon the first task are accessible via the at least one selector. The second task is dependent upon the first task. The system also receives a selection of the second task via the at least one selector. The system also displays the second task.

DETAILED DESCRIPTION

One embodiment provides an improved interface for showing the dependencies between elements, such as tasks, of a Gantt chart. Embodiments improve the overall readability of Gantt charts by avoiding the use of dependency lines, as described in more detail below. Embodiments of the present invention can: (1) for a given task, show the dependent tasks which depend from the given task, (2) show the relationships between different tasks, and (3) navigate from a given task to a dependent task that depends from the given task.

Figure 1:
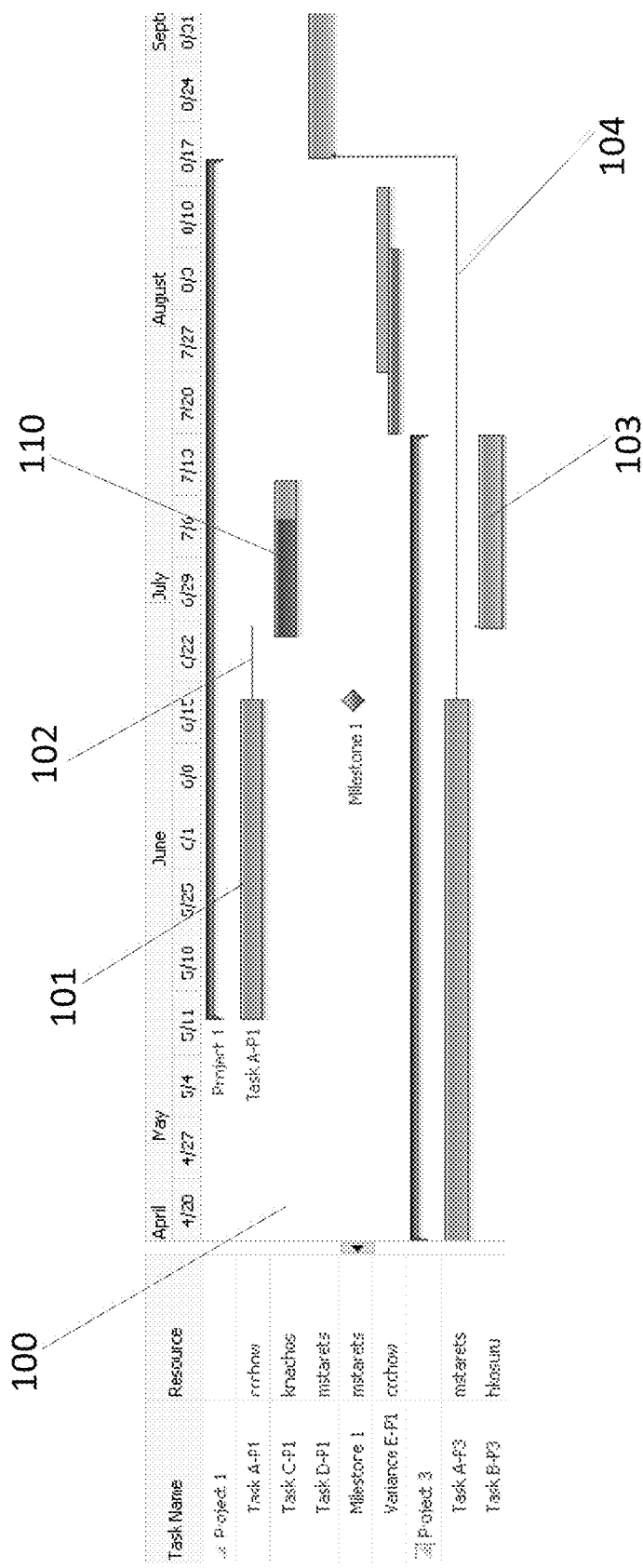
FIG. 1 is a screen shot of an interface that shows dependency relationships in accordance with the prior art.

FIG. 1 is a screen shot of an interface 100 that shows dependency relationships in accordance with the prior art. In order to show dependencies between tasks of a Gantt chart, the previous approaches generally draw/render dependency lines between the tasks to show the dependencies. For example, dependency line 102 illustrates the dependency between task 101 and task 103. However, when rendering the dependency lines for charts that include a large number of dependent tasks, a number of difficulties arise.

First, properly rendering dependency lines for a large number of dependent tasks can be costly in terms of using computing/processing resources. For example, referring again to FIG. 1, in order to properly render dependency line 102 between task 101 and task 103, the system must determine whether task 101 will be located above or below task 103 as shown by the Gantt chart. Specifically, in order for dependency line 102 to be drawn in a manner that properly connects task 101 and task 103, the relative positioning between task 101 and task 103 must generally be determined beforehand.

However, the relative positioning between task 101 and task 103 (and the rendering of line 102), may be affected by the positioning of other tasks. For example, task 110 may affect the relative positioning of task 101 with respect to task 103 by virtue of task 110 being positioned between task 101 and 103. As such, because the relative positioning of tasks (e.g., the positioning of task 101 with respect to task 103) may be affected by other tasks on the Gantt chart, to properly render dependency lines between tasks, the system would generally first need to (1) retrieve information relating to all of the tasks of a Gantt chart and (2) determine the proper positioning of the tasks at interest with respect to the retrieved tasks. Performing (1) and (2) to render dependency lines within a Gantt chart generally becomes very costly to perform in cases where the number of tasks is large.

Other difficulties also arise when rendering dependency lines to show dependencies between tasks. For example, when different tasks within a Gantt chart cannot be displayed upon a single screen (e.g., because the different tasks cannot all fit on one screen), a user may need to scroll downwards or upwards in order to see all of the tasks. If many dependency lines connect the different tasks and extend beyond the bounds of the single screen, the user may be confused by the many dependency lines and may thus have difficulty ascertaining the dependencies between the different tasks.

In view of the above problems with the prior art, one embodiment is an improved method of showing dependencies between elements, such as tasks, in a Gantt chart. As described above, one embodiment improves the readability of Gantt charts by avoiding the use of dependency lines to show dependencies between different elements. As previously described above, one of the difficulties generally associated with the prior art is that the rendering of dependency lines may be costly to perform because the rendering system must receive information regarding the relative positioning between many tasks in order to properly render the dependency lines between the tasks of interest. In contrast to the prior art, one embodiment allows a user to avoid rendering dependency lines and thus to avoid the requirement of sending information regarding the relative positioning of tasks. Therefore, one embodiment reduces the amount of information that is required to be sent to a system for the displaying of dependencies in a Gantt chart, allowing the dependencies of a Gantt chart to be displayed at less cost compared to the prior art.

In addition to displaying the dependencies of a Gantt chart at less cost, one embodiment also more clearly shows the dependencies which exist between different tasks of the Gantt chart, compared to the approaches of the prior art.

Figure 2:
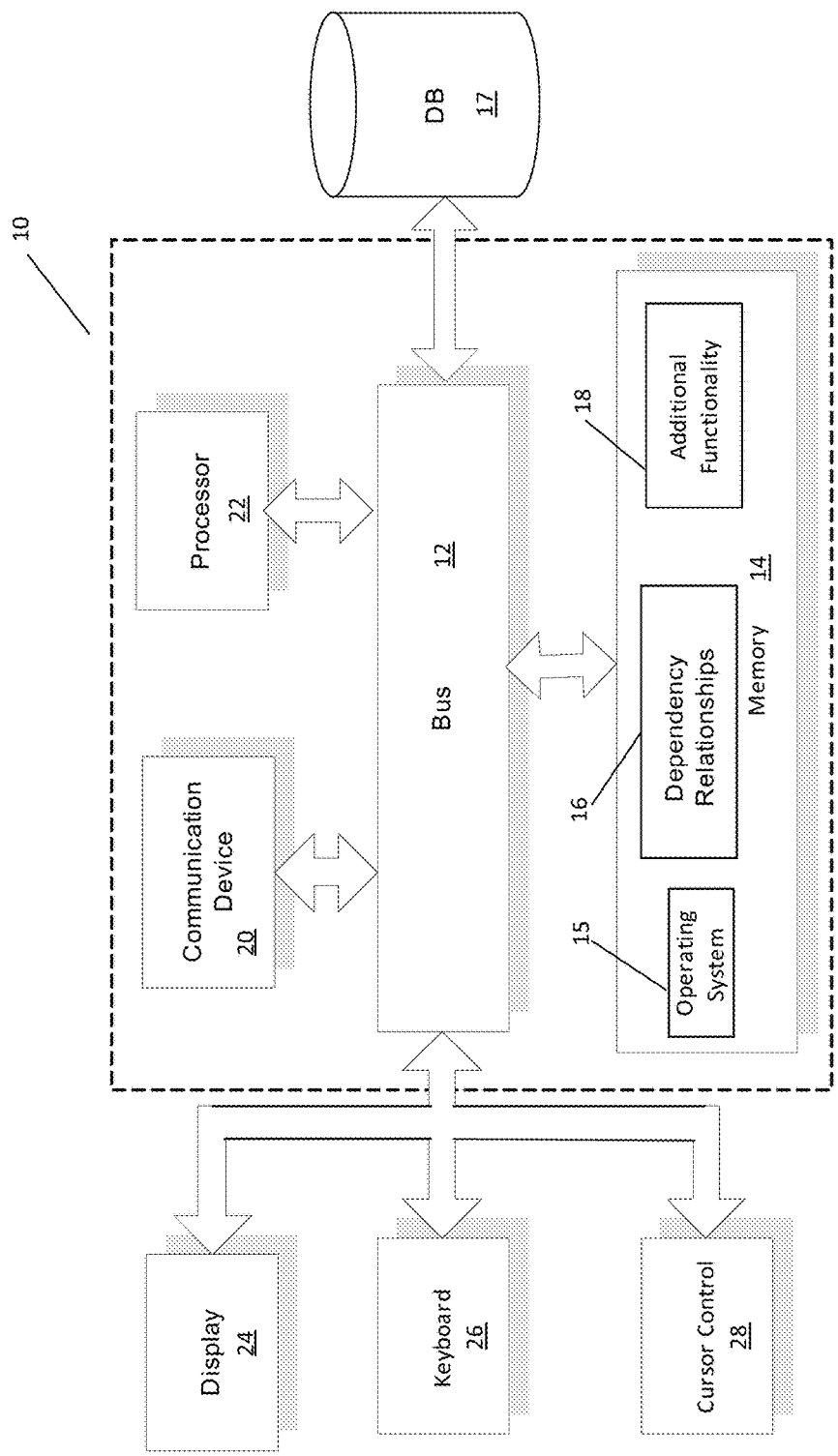
FIG. 2 is an overview block diagram of a computer system for showing dependency relationships in accordance with an embodiment of the present invention.

FIG. 2 is an overview block diagram of a computer system 10 for showing dependency relationships in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include dependency relationships module 16 for a system that shows dependency relationships between elements in a Gantt chart, as disclosed in more detail below. System 10 can be part of a larger system. Therefore, system 10 will typically include one or more additional functional modules 18 to include additional functionality, such as data processing functionality for retrieving and displaying dependency relationships between elements in a Gantt chart, as discussed in more detail below. A database 17 is coupled to bus 12 to store data used with modules 16 and 18.

In one embodiment, instead of drawing/rendering dependency lines between a given task and a dependent task, a menu is provided on the given task which shows the tasks that are dependent upon the given task. When a user accesses the menu provided on the given task, a locating/identifying value is retrieved for the dependent task. For example, when a user accesses the menu provided on the given task, a rowKey value can be retrieved for the dependent task. Information relating to the dependent task can then be retrieved based on the locating/identifying value of the dependent task (e.g., the rowKey value). The user may also navigate to the dependent task via the menu.

In other words, upon retrieving information relating to the dependent task, the menu may then be populated and rendered with the information relating to the dependent task. A user may then select the information relating to the dependent task. If the user selects the information relating to the dependent task, one embodiment automatically scrolls through the Gantt chart to an appropriate row that corresponds to the dependent task to show the dependent task in a highlighted state. Once a user is finished viewing the dependent task, the user can navigate back to the given task by performing an "undo" operation.

In one embodiment, a Gantt component with the above-described functionality is customizable by a developer that is using the Gantt component. For example, the developer can specifically customize the Gantt component to use the above-described menus to locate and view dependent tasks. The developer can customize the Gantt component by modifying specific attributes of the Gantt component. In one example, the Gantt component may have an attribute, such as a "dependencyLinesVisible" attribute, which can be changed to allow "popup" menus to show the above-described menus. The developer may set the "dependencyLinesVisible" attribute via "set/getDependencyLinesVisible" methods, for example. The attribute of the Gantt component may also allow the developer to render dependency lines, if the developer chooses to do so. Developers may use different application programming interfaces ("APIs") to interact with the Gantt component.

In one embodiment, a user or a developer may choose between different ways of showing dependencies between tasks of a Gantt chart. One option could be to show the dependencies by rendering dependency lines. A second option could be to show the dependencies by using menu items, as previously described above. Another option could be to not show the dependencies at all.

As described above, in certain embodiments, a menu is provided on a given task which shows the tasks that are dependent upon the given task. In one embodiment, the user may also customize the menu. For example, a user may choose to receive different types of information via the menu, information such as "taskName," "startTime," and "endTime" from the menu, for example. This information, when shown in the menu associated with the given task, corresponds to showing at least one dependent task's identifying name, the dependent task's starting time, and the one dependent task's ending time, respectively.

Figure 3:
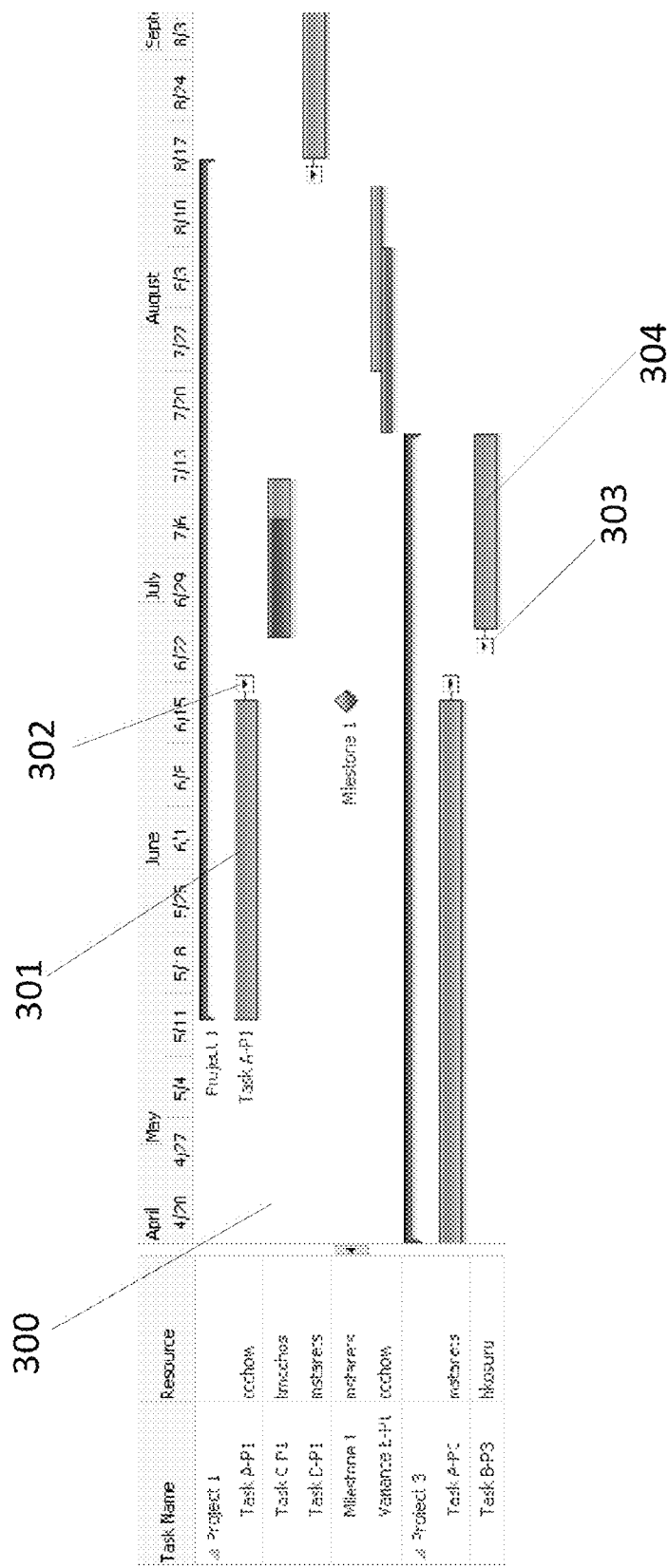
FIG. 3 is a screen shot of an interface that shows dependency relationships using selectors in accordance with one embodiment.

FIG. 3 is a screen shot of an interface 300 that shows dependency relationships using selectors in accordance with one embodiment. A given task 301 may be associated with one or more selectors 302. For example, in one embodiment, a given task may be associated with a "predecessor selector" and/or a "successor selector." Referring to FIG. 3, task 301 is associated with successor selector 302, and task 304 is associated with predecessor selector 303. In one embodiment, a predecessor selector may access a submenu that appears for a given task, if the given task has at least one dependent task that depends upon the starting time of the given task. The predecessor selector shows the dependent tasks that depend on the starting time of the given task. For example, referring to FIG. 3, predecessor selector 303 shows the dependent tasks that depend on the starting time of task 304. In one embodiment, a dependent task depends on a starting time of a given task if the dependent task has a "start-start" or a "start-finish" dependency relationship with the given task. In another embodiment, a successor selector may access a submenu that appears for a given task, if the given task has at least one dependent task that depends upon the ending time of the given task. Referring again to FIG. 3, successor selector 302 may access a submenu that appears for task 301, if task 301 has at least one dependent task that depends upon its ending time.

Successor selector 302 shows the dependent tasks that depend on the ending time of task 301. In one embodiment, a dependent task depends on an ending time of a given task if the dependent task has a "finish-start" or a "finish-finish" dependency relationship with the given task.

Figure 4:
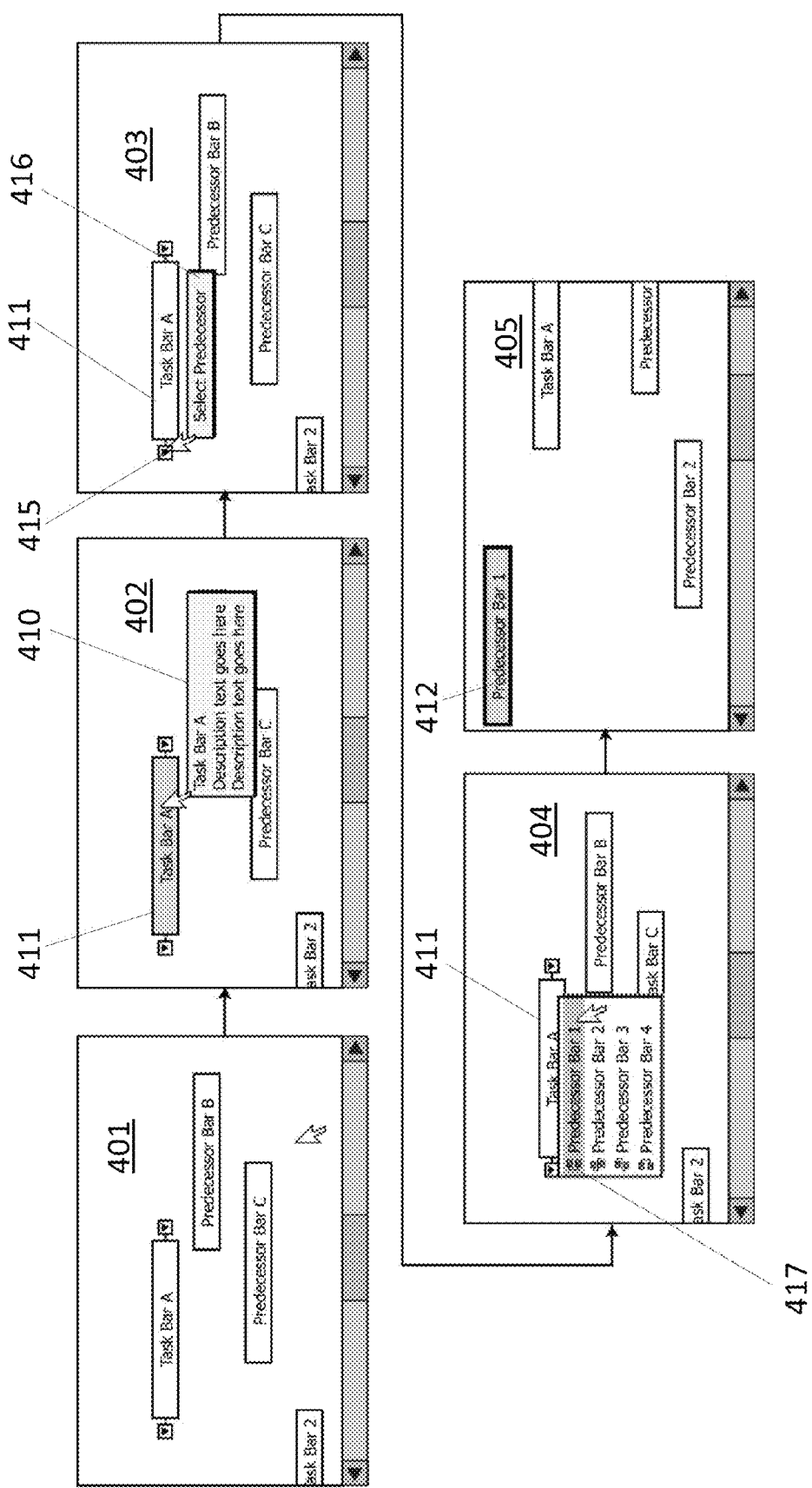
FIG. 4 illustrates a process of displaying a menu of a task and navigating to a dependent task in accordance with another embodiment.

FIG. 4 illustrates a process of displaying a menu 410 of a task 411 and navigating to a dependent task 412 in accordance with another embodiment. FIG. 4 shows a progression of screen shots (from 401 to 405). Each of screenshots 401-405 shows an interface that contains elements (e.g., tasks). Dependencies exist between the elements. Referring to screenshot 402, as described above, a user can access a menu 410 provided on a given task 411. The menu 410 can be accessed via a mouse cursor, for example. Menu 410 can provide a description of task 411.

Referring to screenshot 403, as described above, task 411 can be associated with a predecessor selector 415. A user can access a data tip 416 via predecessor selector 415, as described in more detail below.

Referring to screenshot 404, as described above, a submenu 417 (that lists dependent tasks that depend on the starting time of the given task 411) can be accessed from predecessor selector 415.

Next, referring to screenshot 405, a user can access "Predecessor Bar 1" from the list of dependent tasks 417. One embodiment then navigates to dependent task 412 (which corresponds to "Predecessor Bar 1").

Figure 5:
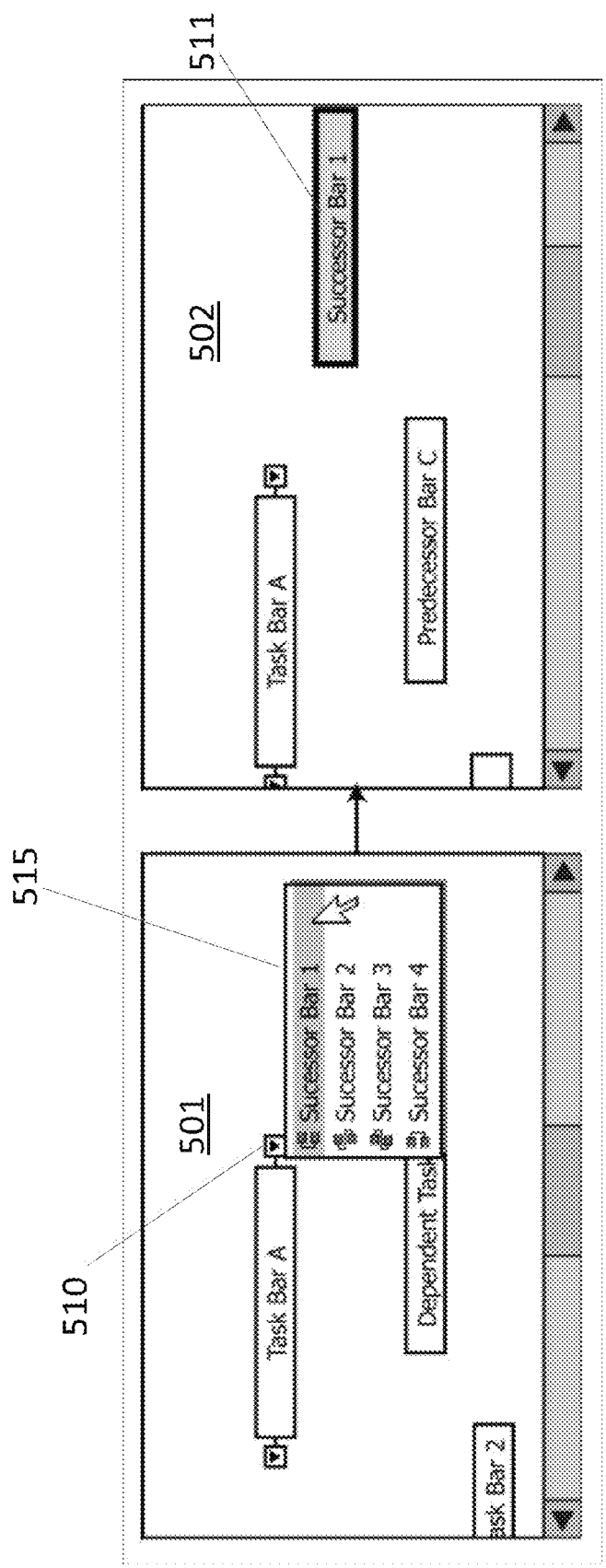
FIG. 5 illustrates a process of navigating to a dependent task in accordance with another embodiment.

FIG. 5 illustrates a process of navigating to a dependent task 511 in accordance with another embodiment. FIG. 5 shows a progression of screen shots (from 501 to 502). One embodiment can access a successor selector 510. Submenu 515 can be accessed via successor selector 510. Next, referring to screenshot 502, a user can access "Successor Bar 1" from the list of dependent tasks from submenu 515. One embodiment then navigates to dependent task 511 (which corresponds to "Successor Bar 1").

Figure 6:
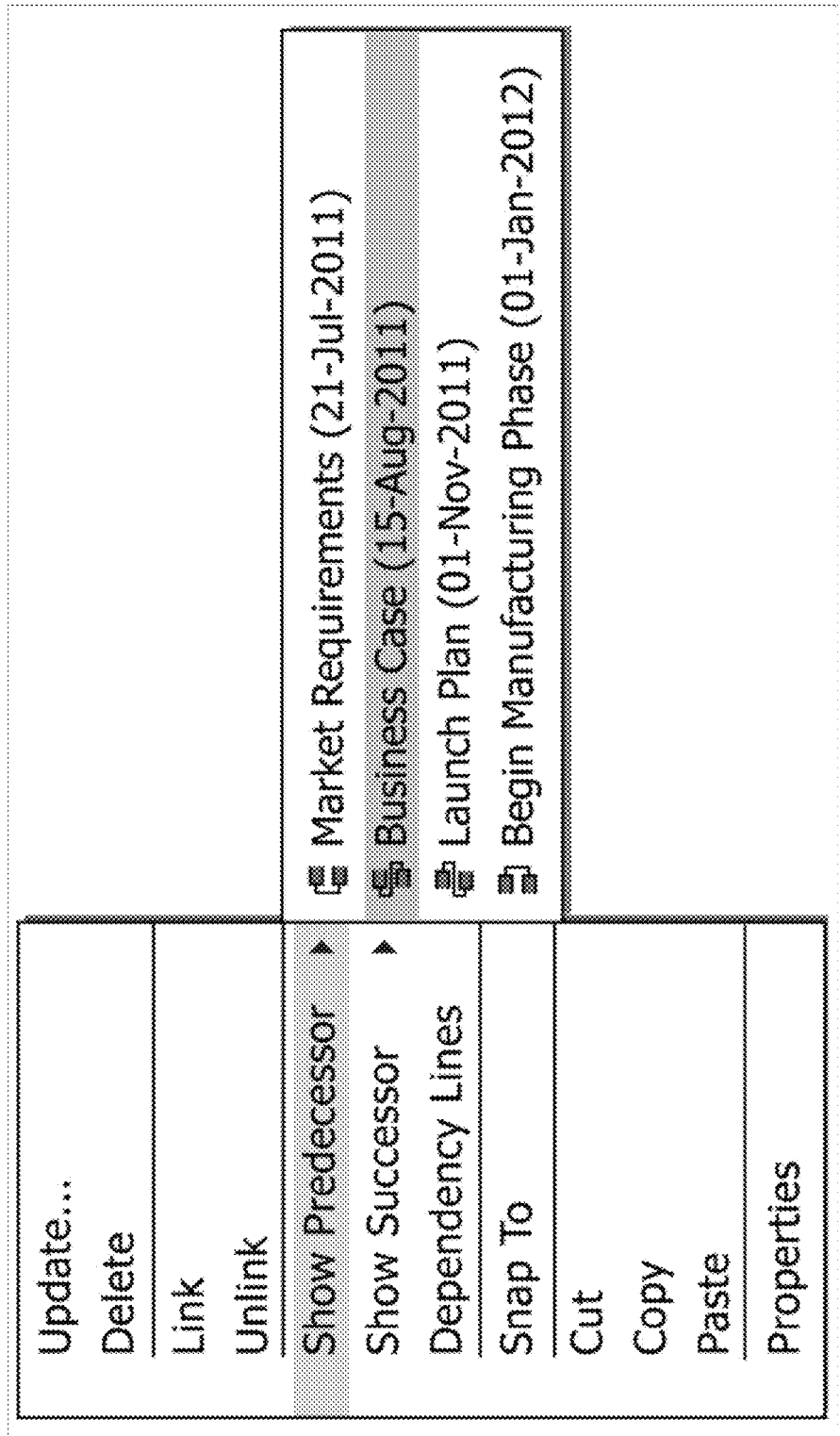
FIG. 6 illustrates a menu provided on a given task in accordance with another embodiment.

FIG. 6 illustrates a menu provided on a given task in accordance with another embodiment. As described above, in one embodiment, a user can access a menu provided on a given task. For example, referring again to screenshot 402 of FIG. 4, a user can access menu 410 on a given task 411. As described above, in one embodiment, a user can access different functionality via menu 410 (such as viewing the tasks that are dependent upon given task 411). FIG. 6 illustrates different functionality that a user can access via a menu. The functionality includes showing dependent tasks (i.e., "Show Predecessor" and "Show Successor") as well as showing dependency lines (i.e., "Dependency Lines").

Figure 7:
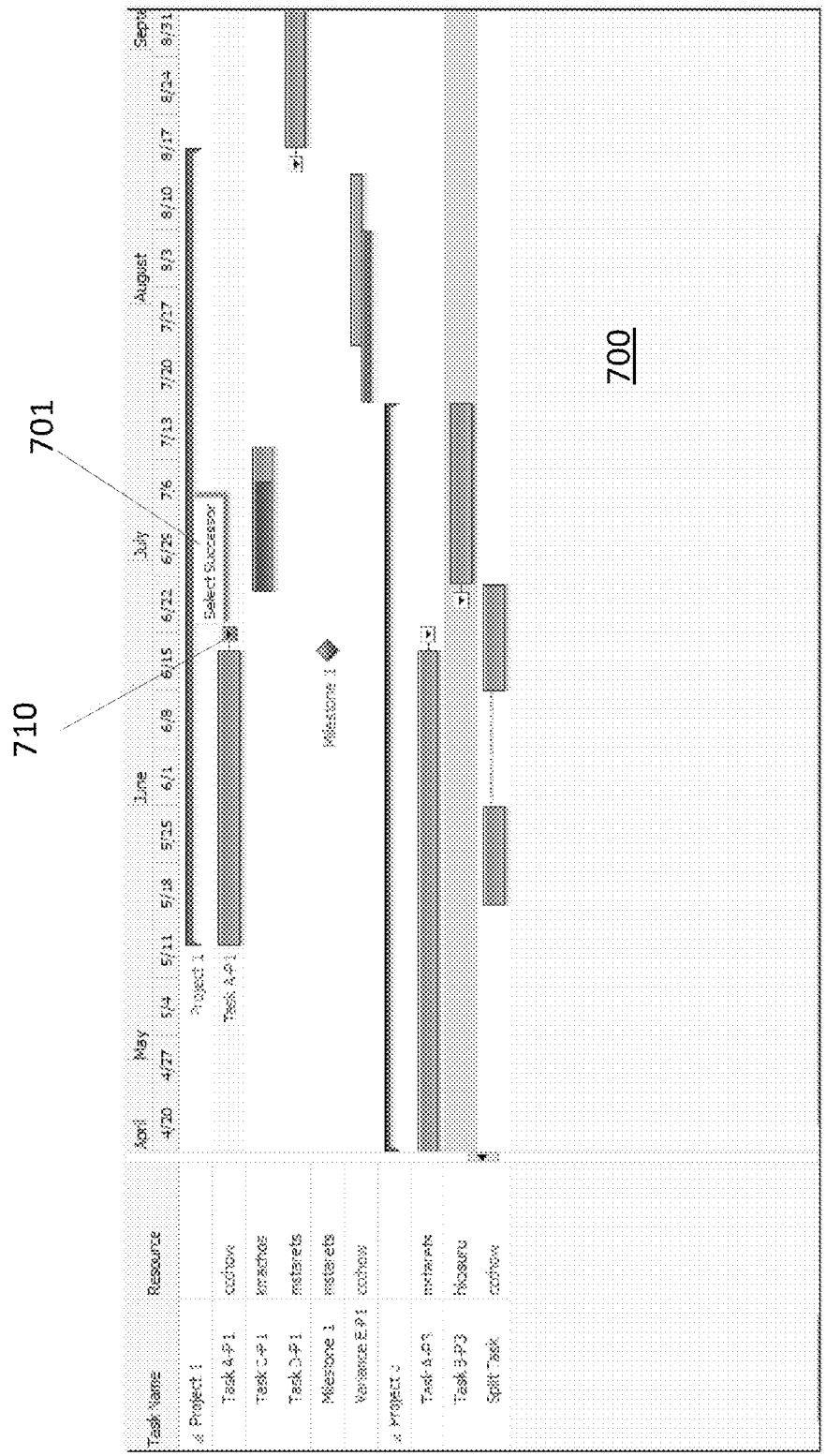
FIG. 7 is a screen shot of an interface that shows a data tip in accordance with one embodiment.

FIG. 7 is a screen shot of an interface 700 that shows a data tip 701 in accordance with one embodiment. One embodiment may provide a user with different data tips, depending on the user's interaction with the Gantt chart. To illustrate the operation of this embodiment, suppose that a given task on a Gantt chart includes different selectors (e.g., a predecessor selector and a successor selector). Next, suppose that the user moves a selecting device (e.g., a mouse cursor) over the given task. In one embodiment, when the user hovers the selecting device over the task, a data tip may appear after a predetermined amount of time. The data tip may provide helpful information to the user to aid the user. Next, suppose that the user moves the selecting device over a predecessor selector. When the user hovers the selecting device over the predecessor selector, another data tip may appear after a predetermined amount of time. Next, suppose that the user clicks on the predecessor selector. Once the predecessor selector is clicked, a submenu may appear that shows options associated with the predecessor selector. Next, once a user selects one of the associated options, the submenu is dismissed, and the Gantt chart auto-scrolls so that a dependent task dependent on the starting time of the given task (and corresponding to the option selected in the submenu) is shown. Referring to interface 700 of FIG. 7, if the user hovers the selecting device over a successor selector 710, a data tip 701 can appear to aid the user.

In view of the above, one embodiment allows a user to selectively choose which dependent tasks of a given task should be displayed/navigated to. Embodiments of the present invention also allow a user to identify and reference dependent tasks that depend from a starting time and/or an ending time of a given task.

As discussed above, in one embodiment, a given task can have one or more selectors (e.g., predecessor selectors and/or successor selectors) that allow for the displaying of submenus that show dependent tasks of the given task. These selectors may appear as buttons that can be disabled by default. The selectors can neighbor the tasks that they are associated with. For example, the buttons can prepend and/or append to a given task. For example, a button corresponding to a predecessor selector can prepend to the given task. A button corresponding to a successor selector can append to a given task. Referring again to FIG. 3, successor selector 302 appends to task 301. Predecessor selector 303 prepends to task 304.

In one embodiment, if a user clicks on a button corresponding to a selector, a corresponding submenu will pop up and show different dependency types. As described above, different dependency types may include: a start-to-start type, a start-to-finish type, a finish-to-start type, and a finish-to-finish type. As described above, in one embodiment, a predecessor selector submenu contains information relating to dependent tasks that have a start-to-start or a start-to-finish relationship with the given task. A successor selector submenu contains information relating to dependent tasks that have a finish-to-start or a finish-to-finish relationship with the given task. Once a user selects a dependent task, the chart region auto-scrolls to reveal the dependent task. In cases where the task is wider than the viewable area, that portion of the task that is out of view will be clipped from view.

In one embodiment, each button corresponding to a selector may have 3 states: an enabled state, a mouse-over state, and a mouse-down state. The above-described tool tips that are prompted by a mouse-over state may be directed to the relevant functionality of the button that is being hovered over by the mouse. For example, the tool tip that is prompted by a mouse hovering over the prepended button is directed to functionality relating to the predecessor selector. The tool tip that is prompted by a mouse hovering over the appended button is directed to functionality relating to the successor selector. The prepended button and/or the appended button can be hidden if there is no dependency relationship corresponding to the prepended button and/or the appended button.

One embodiment allows a user to navigate through different parts of a Gantt chart by using keyboard navigation. The user can undo navigation steps through the dependent tasks by invoking the keyboard combination (Ctrl+Z) while the Gantt chart is focused upon by the viewing window. While a given task is focused upon, in one embodiment, a user may move focus to a predecessor selector of the given task by pressing (Ctrl+LeftArrow). In one embodiment, the user may move focus to a successor selector of the given task by pressing (Ctrl+RightArrow). In one embodiment, the user may open a submenu of a selector by pressing (Enter) while the selector is focused upon. In one embodiment, the user can open a menu of a given task by pressing (Ctrl+Alt+M) while the given task is focused upon.

To illustrate the operation of one embodiment, suppose that a given task is focused upon/has active focus by a viewing window. If the user chooses a selector, the interface will move the focus to a predecessor selector or a successor selector. If the user then presses (Enter), a submenu appears. If the user then presses (DownArrow), then submenu options corresponding to the selector are focused upon. If the user then presses (Enter), then a submenu option becomes selected, the submenu dismisses, and the Gantt auto-scrolls to reveal a dependent task corresponding to the selected submenu option.

In one embodiment, a set of gestures corresponding to the previously described mouse-interactions is provided. Specifically, each type of mouse-interaction has a corresponding gesture. These gestures can be used in conjunction with devices which do not have a mouse cursor. Examples of such devices include tablet devices or mobile devices. A gesture including (finger down+hold) corresponds to a mouse interaction of "hovering." A gesture including (finger down+hold+release) corresponds to a mouse interaction of "right click." A gesture including (tap) corresponds to a mouse interaction of "left click."

Figure 8:
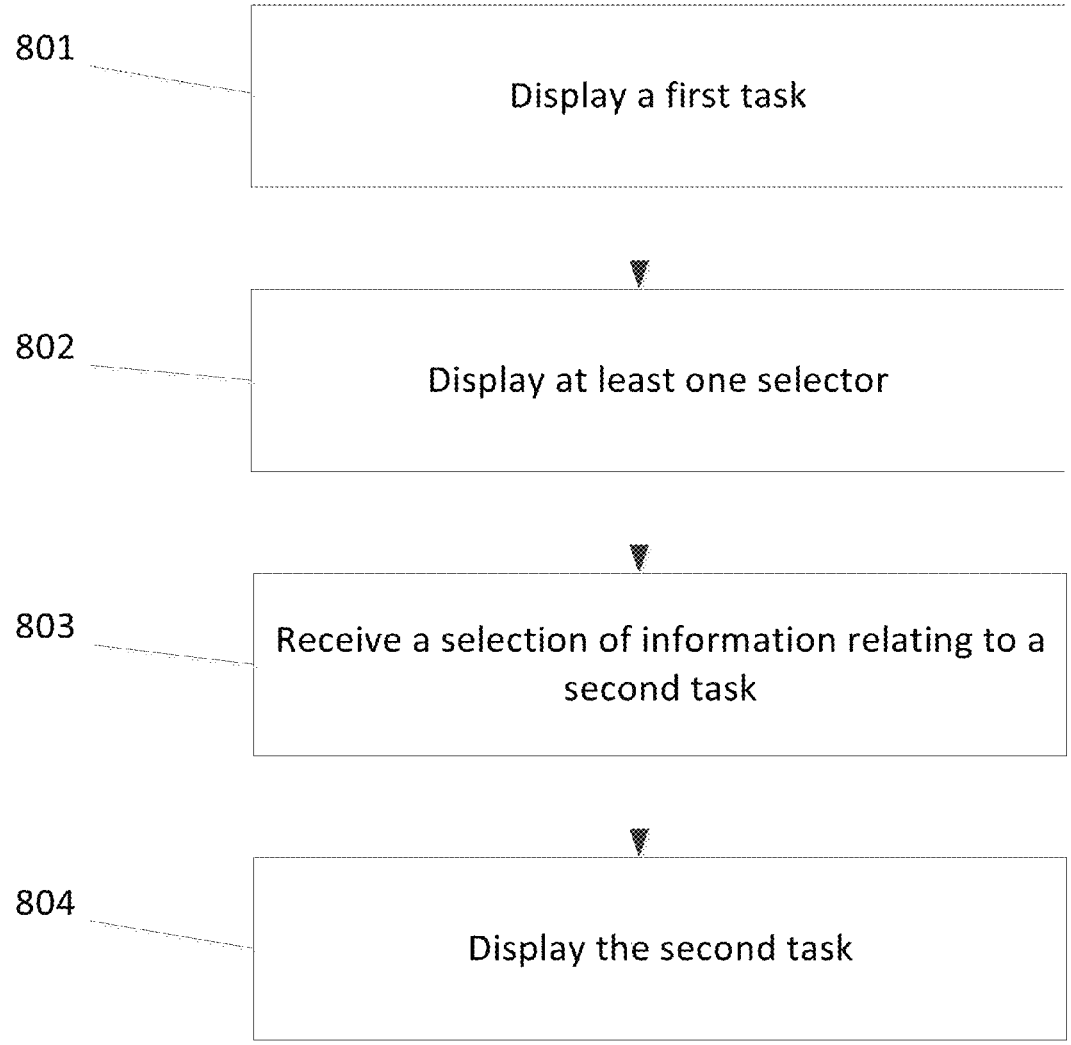
FIG. 8 is a flow diagram of the functionality of the dependency relationships module of FIG. 2 in accordance with one embodiment.

FIG. 8 is a flow diagram of the functionality of the dependency relationships module 16 of FIG. 2 in accordance with one embodiment. In one embodiment, the functionality of the flow diagram of FIG. 8 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 801, one embodiment displays a first task. As previously described, the first task can correspond to a task (e.g., task 301 of FIG. 3) within a Gantt chart. As previously described, the first task can be displayed via various interfaces (e.g., interface 300 of FIG. 3).

At 802, one embodiment displays at least one selector. The at least one selector is associated with the first task. Tasks dependent upon the first task are accessible via the at least one selector. The second task is dependent upon the first task.

At 803, one embodiment receives a selection of the second task via the at least one selector. As described above, in one embodiment, a given task may have an associated predecessor selector and/or a successor selector, and a user may make a selection via the associated selector.

At 804, one embodiment displays the second task. As described above, in one embodiment, the system may automatically navigate a user to the second task.

As described above, one embodiment more clearly shows the dependencies between tasks of a Gantt chart. For example, one embodiment more clearly shows these dependencies, and improves the overall readability of Gantt charts, by avoiding the use of dependency lines. Embodiments of the present invention can: (1) for a given task, show the dependent tasks which depend from the given task, (2) show the relationships between different tasks, and (3) navigate from a given task to a dependent task that depends from the given task.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to show a dependency relationship between a first task and a second task in a Gantt chart, the showing comprising:
    displaying the first task on the Gantt chart;
    displaying at least one selector on the same display as the first task, wherein the at least one selector is associated with the first task, and tasks dependent upon the first task are accessible via the at least one selector, and the second task is dependent upon the first task because the second task depends on a starting time of the first task or an ending time of the first task;
    receiving a selection of the second task via the at least one selector; and
    in response to the selection, displaying the second task on the Gantt chart, wherein the displaying the second task comprises automatically navigating to a location on the Gantt chart of the second task, wherein the automatically navigating comprises scrolling through the Gantt chart to the displayed second task when the second task is not displayed on the Gantt chart on the same display as the displayed first task before receiving the selection;
    wherein the first task and second task are displayed as task bars, each task bar having a size that is proportional to a corresponding start date and end date;
    wherein the displaying at least one selector comprises displaying a predecessor selector or a successor selector, wherein tasks that depend on the starting time of the first task are accessible via the predecessor selector, and tasks that depend on the ending time of the first task are accessible via the successor selector.

2. The computer readable medium of claim 1, wherein the at least one selector neighbors the displayed first task.

3. The computer readable medium of claim 1, wherein displaying the first task and displaying the second task does not include rendering any dependency lines.

4. The computer readable medium of claim 1, wherein displaying the at least one selector comprises displaying both the predecessor selector and the successor selector.

5. The computer readable medium of claim 1, wherein the predecessor selector is prepended to the displayed first task, and the successor selector is appended to the displayed first task.

6. The computer readable medium of claim 1, the showing further comprising, in response to a selection of an undo operation, automatically navigating back to the displayed first task from the displayed second task.

7. A method for showing a dependency relationship between a first task and a second task in a Gantt chart, the method comprising:
    displaying the first task on the Gantt chart;
    displaying at least one selector on the same display as the first task, wherein the at least one selector is associated with the first task, and tasks dependent upon the first task are accessible via the at least one selector, and the second task is dependent upon the first task because the second task depends on a starting time of the first task or an ending time of the first task;
    receiving a selection of the second task via the at least one selector; and
    in response to the selection, displaying the second task on the Gantt chart, wherein the displaying the second task comprises automatically navigating to a location on the Gantt chart of the second task, wherein the automatically navigating comprises scrolling through the Gantt chart to the displayed second task when the second task is not displayed on the Gantt chart on the same display as the displayed first task before receiving the selection;

wherein the first task and second task are displayed as task bars, each task bar having a size that is proportional to a corresponding start date and end date;

wherein the displaying at least one selector comprises displaying a predecessor selector or a successor selector, wherein tasks that depend on the starting time of the first task are accessible via the predecessor selector, and tasks that depend on the ending time of the first task are accessible via the successor selector.

8. The method of claim 7, wherein the at least one selector neighbors the displayed first task.

9. The method of claim 7, wherein displaying the first task and displaying the second task does not include rendering any dependency lines.

10. The method of claim 7, wherein displaying at least one selector comprises displaying both the predecessor selector and the successor selector.

11. The method of claim 7, wherein the predecessor selector is prepended to the displayed first task, and the successor selector is appended to the displayed first task.

12. The method of claim 7, further comprising, in response to a selection of an undo operation, automatically navigating back to the displayed first task from the displayed second task.

13. A system for showing a dependency relationship between a first task and a second task in a Gantt chart, the system comprising:

a processor;

a memory coupled to the processor;

a first displaying module that displays the first task on the Gantt chart;

a second displaying module that displays at least one selector on the same display as the first task, wherein the at least one selector is associated with the first task, and tasks dependent upon the first task are accessible via the at least one selector, and the second task is dependent upon the first task because the second task depends on a starting time of the first task or an ending time of the first task;

a receiving module that receives a selection of the second task via the at least one selector; and a third displaying module that in response to the selection displays the second task on the Gantt chart, wherein the displaying the second task comprises automatically navigating to a location on the Gantt chart of the second task, wherein the automatically navigating comprises scrolling through the Gantt chart to the displayed second task when the second task is not displayed on the Gantt chart on the same display as the displayed first task before receiving the selection;

wherein the first task and second task are displayed as task bars, each task bar having a size that is proportional to a corresponding start date and end date;

wherein the displaying at least one selector comprises displaying a predecessor selector or a successor selector, wherein tasks that depend on the starting time of the first task are accessible via the predecessor selector, and tasks that depend on the ending time of the first task are accessible via the successor selector.

14. The system of claim 13, wherein the at least one selector neighbors the displayed first task.

15. The system of claim 13, wherein displaying the first task and displaying the second task does not include rendering any dependency lines.

16. The system of claim 13, wherein displaying at least one selector comprises displaying both the predecessor selector and the successor selector.

17. The system of claim 16, wherein the predecessor selector is prepended to the displayed first task, and the successor selector is appended to the displayed first task.

18. The system of claim 13, wherein the displaying the second task comprises, in response to a selection of an undo operation, automatically navigating back to the displayed first task from the displayed second.

* * * * *